United States Patent
Limbach et al.

(10) Patent No.: US 11,524,287 B2
(45) Date of Patent: Dec. 13, 2022

(54) AUTOMATIC PIPETTING DEVICE FOR TRANSFERRING SAMPLES AND/OR REAGENTS AND METHOD FOR TRANSFERRING LIQUID SAMPLES AND/OR REAGENTS

(71) Applicant: Meon Medical Solutions GmbH & Co KG, Graz (AT)

(72) Inventors: Berthold Limbach, Lotzwil (CH); Wolfgang Sprengers, Vasoldsberg (AT)

(73) Assignee: MEON MEDICAL SOLUTIONS GMBH & CO KG, Graz (AT)

( * ) Notice: Subject to any disclaimer, the term of this patent is extended or adjusted under 35 U.S.C. 154(b) by 173 days.

(21) Appl. No.: 16/629,541

(22) PCT Filed: Jul. 13, 2018

(86) PCT No.: PCT/AT2018/060148
§ 371 (c)(1),
(2) Date: Jan. 8, 2020

(87) PCT Pub. No.: WO2019/010515
PCT Pub. Date: Jan. 17, 2019

(65) Prior Publication Data
US 2020/0139360 A1    May 7, 2020

(30) Foreign Application Priority Data

Jul. 14, 2017  (AT) .................................. 50593/2017
Jul. 14, 2017  (AT) .................................. 50595/2017

(51) Int. Cl.
*B01L 3/02*  (2006.01)
*G01N 35/10*  (2006.01)

(52) U.S. Cl.
CPC ........ *B01L 3/0289* (2013.01); *G01N 35/1002* (2013.01); *G01N 35/109* (2013.01); *G01N 35/1072* (2013.01); *G01N 2035/1076* (2013.01)

(58) Field of Classification Search
None
See application file for complete search history.

(56) References Cited

U.S. PATENT DOCUMENTS 5,897,837 A      4/1999  Mizuno
9,341,229 B1 *  5/2016  Wiederin .................. B01L 9/02
(Continued)

FOREIGN PATENT DOCUMENTS

EP    0601213 A1    6/1994
EP    1230553 B1    8/2008
(Continued)

*Primary Examiner* — P. Kathryn Wright
(74) *Attorney, Agent, or Firm* — Dykema Gossett PLLC (57) ABSTRACT

Aspects of the present disclosure relate to methods and devices for automatically transferring samples and/or reagents from sample vessels and/or reagent vessels into at least one receiving vessel In one example embodiment, a pipetting device is disclosed including a pipettor that is movable along a first direction and has at least one first pipetting needle that is movable along an arm of the pipettor along a second direction, substantially normal to the first direction. The pipetting needle is lowerable along a third direction into the individual vessels. In some specific embodiments, the arm of the movable pipettor has at least one second pipetting needle which, regardless of the current position of the first pipetting needle, is movable past the first pipetting needle and is lowerable into the individual vessels.

13 Claims, 6 Drawing Sheets

(56) References Cited

U.S. PATENT DOCUMENTS

| | | | | |
|---|---|---|---|---|
| 2007/0264725 A1* | 11/2007 | Wiggli | ............... | G01N 35/1067 |
| | | | | 436/180 |
| 2008/0240898 A1 | 10/2008 | Manz et al. | | |
| 2010/0193826 A1* | 8/2010 | Kim | ........................ | H01L 33/44 |
| | | | | 257/E33.074 |
| 2015/0273464 A1* | 10/2015 | Fukuju | .................... | B01L 3/527 |
| | | | | 435/5 |
| 2017/0131308 A1* | 5/2017 | Ito | .......................... | C12M 33/06 |

FOREIGN PATENT DOCUMENTS

| | | |
|---|---|---|
| EP | 2410342 A2 | 1/2012 |
| WO | 2011119441 A1 | 9/2011 |
| WO | 2014041113 A1 | 3/2014 |

\* cited by examiner

AUTOMATIC PIPETTING DEVICE FOR TRANSFERRING SAMPLES AND/OR REAGENTS AND METHOD FOR TRANSFERRING LIQUID SAMPLES AND/OR REAGENTS

CROSS-REFERENCE TO RELATED APPLICATIONS

This application is a national stage filing based upon International PCT Application No. PCT/AT2018/060148, filed 13 Jul. 2018, which claims the benefit of priority to Austria application No. A 50593/2017, filed 14 Jul. 2017, and Austria application No. A 50595/2017, filed 14 Jul. 2017.

BACKGROUND

The invention relates to an automatic pipetting device for transferring samples and/or reagents from sample vessels and/or reagent vessels into at least one receiving vessel, for example of an analyzer for analyzing liquid samples, wherein a pipettor of the pipetting device is designed to be movable along a first direction and has at least one first pipetting needle which is designed to be movable along an arm of the pipettor along a second direction, substantially normal to the first direction, and is destined to be lowerable into the individual vessels. The invention further relates to a method for transferring liquid samples and/or reagents from sample vessels and/or reagent vessels into at least one receiving vessel of an automatic pipetting device.

Pipetting machines or pipetting devices for transferring defined quantities of liquid between different liquid vessels distributed in a grid-like manner on a surface are known from the prior art. By way of example, physical, chemical or biological liquid samples may be treated with particular reagents or dilution liquids in the context of preparing a sample for the measurement of chemico-physical parameters that is carried out in an analysis device. Said machines have one or more pipetting units with an associated pipetting needle for taking up and dispensing liquids, these being movable in one or more horizontal directions, relative to the surface on which the liquid vessels are located, and being lowerable into the liquid containers. In addition, needle washing devices are required in order to prevent liquid substance residues which adhere to the needles from being carried over into other vessels. Besides precisely metering the liquid, the construction of the pipetting machines is always aimed at achieving the greatest possible number of pipetting operations per unit of time (high throughput).

For a better understanding of the invention, a few essential technical terms used in the present application will be defined in greater detail:

Pipetting Unit:

This refers to the entire system of an automatic pipetting device for transferring liquid between different vessels, which comprises one or more movable pipettors together with all the movable and stationary components necessary for the functioning thereof, including fluidics for supply purposes (hose connections, pumps, valves, containers, etc.), sensors, controller and power supply.

Pipettor:

This describes a component of the pipetting unit which is pivotable or linearly movable horizontally in at least one direction relative to the receiving vessels (sample vessels, reagent vessels, reaction vessels or cuvettes). The pipettor includes a suspended component having at least one pipetting needle which is designed to be movable on its own or together with the pipettor and such as to be lowerable into the aforementioned vessels.

Pipetting Needle:

This refers to a cannula or hollow needle, which is attached to the pipettor, together with the associated support with connection elements for the fluidics for aspirating samples out of the sample vessels and/or for aspirating reagents out of the reagent vessels and for dispensing the aspirated liquids into the receiving vessels or cuvettes in a metered manner.

Reagent Vessel:

Vessel or container for holding reagents which are required in order to carry out the analysis.

Sample Vessel:

Vessel or container which contains, in the analyzer, the analysis sample from which multiple smaller sample quantities (aliquots) can be taken in order to analyze individual analytes or parameters. The analysis does not take place in the vessel of the analysis sample, but rather in the cuvette after the reagents have been added thereto, the cuvette in this sense serving as a reaction vessel.

EP 1 230 553 B1 (MAXMAT) discloses in this connection a chemical or biological analyzer which has a storage module for sample tubes and tubes for reagents. Also provided is an analysis module having a reaction container in the form of a microtiter plate and a sample-taking module (pipettor) which is movable on a rail and which has two pipetting needles arranged at a fixed distance from one another, which pipetting needles operate independently of one another in the z-direction in order to take samples automatically and are each equipped with a retractable aspirating pipette for transferring predetermined quantities of samples and reagents from the storage module to the analysis module. The two pipetting needles are movable only jointly in the horizontal x/y plane.

The analysis module has a heating plate for the microtiter plate, which heating plate is arranged close to the lower region of the wells of the microtiter plate in order to heat the contents of the wells by convection. The sample-taking unit further comprises a mixing device which is controlled by an electromagnet in order to bring about an alternating back-and-forth movement of the pipetting needle when the latter is in a lowered position in a well of the microtiter plate, so as to thoroughly mix the mixture consisting of samples and reagents.

In addition, EP 2 410 342 A2 (HOFFMANN-LA ROCHE) discloses a pipetting device having a pipettor with multiple flat frame elements which are arranged next to one another and which, together with the pipetting needles thereof, are jointly movable on a main frame body in a horizontal x-direction that is normal to the main frame body. The pipetting device serves to transfer samples or reagents from a first row of vessels to a second row of vessels which is offset in the x-direction. The pipetting needles are first adjusted in the y-direction to the spacing of the vessels of the first row in order to take up sample liquid or reagent liquid, and then are adapted to the spacing of the second row of vessels in order to dispense the sample liquid or reagent liquid. However, an independent movement of two pipetting needles in the x- and y-direction is not provided. Movement modules for the y-direction and the z-direction (lifting and lowering of the pipetting needles) are arranged in gaps in flat, adjacent frame elements in order to keep the spacing between the individual pipetting needles small. However, an independent movement of the pipetting needles in the y-direction is possible only to a limited extent. For example, it is not possible for the frame elements to move past one another on the transfer arm, which results in a mutual restriction of the freedom of movement of the pipetting needles in the y-direction. Such pipetting devices find a useful application particularly in connection with microtiter plates.

Figure 1:
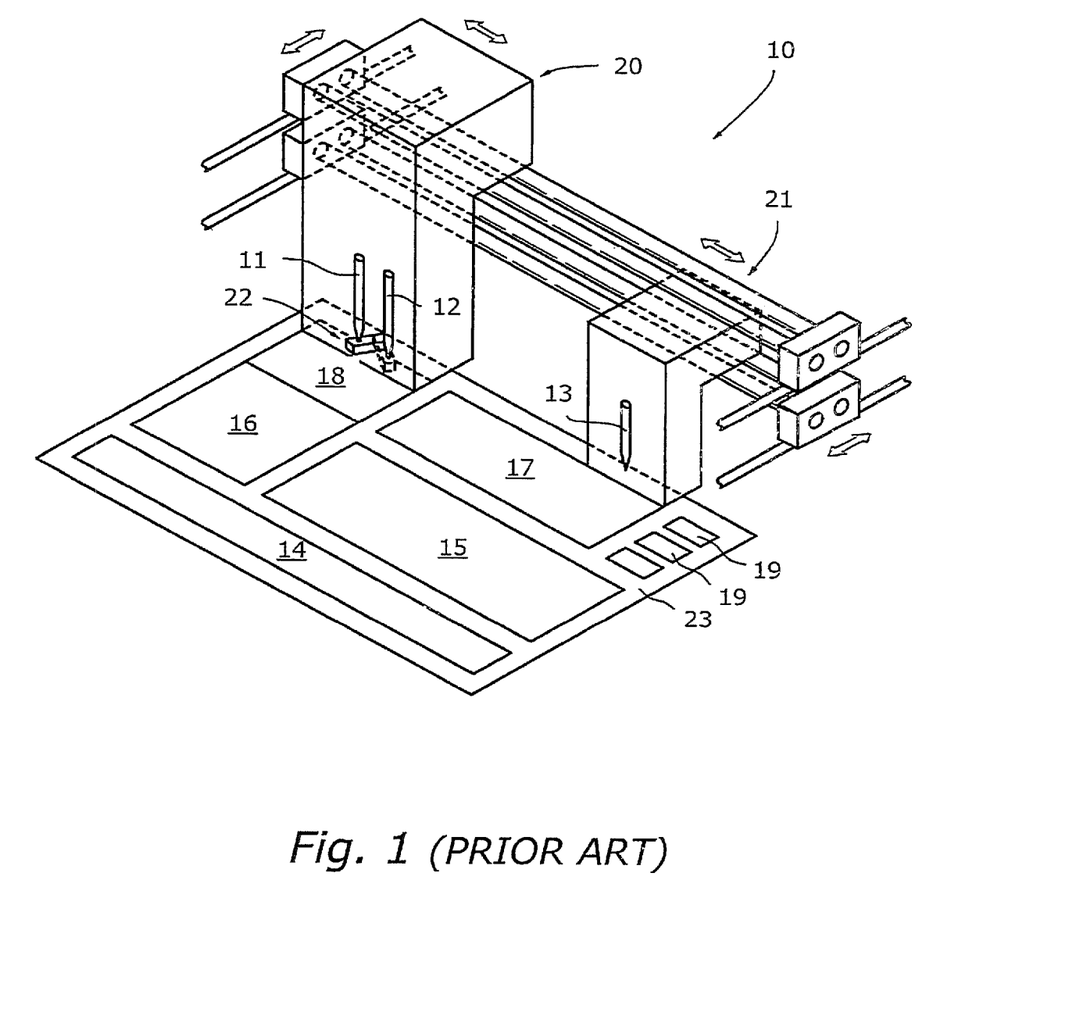
FIG. 1 shows an automatic pipetting device for transferring samples and reagents according to the prior art, in a three-dimensional view.

Finally, U.S. Pat. No. 5,897,837 A (TOA MEDICAL) describes an automatic pipetting device or a pipetting machine for pretreating samples for an immunoassay analyzer. As shown in FIG. 1 of the present application, the pipetting machine 10 has a first pipettor 20 which is movable horizontally in the x- and y-direction and which is equipped with two pipetting needles 11 and 12, it being possible for said pipetting needles to be lowered or lifted in the vertical direction independently of one another. In this case, one of the two needles 11 may be assigned to reagents, while the other needle 12 is assigned to samples which are arranged in different sections 14 to 19 of a table plane 23. In addition, a second pipettor 21 is also present, which is movable in the x-y direction and has a lowerable pipetting needle 13.

The first, horizontally movable pipettor 20 carries a needle washing unit 22, which can move back and forth horizontally between the vertical lowering paths of the two pipetting needles 11, 12. In each case, alternately one of the two needles can be being cleaned, while the other needle is carrying out a pipetting process. The two pipetting needles 11, 12 of the first pipettor 20 can only be moved jointly in the x- or y-direction.

This has the disadvantage that the weights of the robotics components of the pipettor 20 cannot be distributed across the two horizontal movement axes x and y, so that the weight of the second pipetting unit must always also be accelerated in order to move to positions in the y direction. Likewise, the weight of the needle washing unit 22 together with the needle washing vessel must also always be accelerated in both horizontal directions. Furthermore, due to the joint horizontal movement, it is not possible for example to use both needles 11, 12 simultaneously for pipetting at different vessel rows which are not adjacent in the x-direction.

WO 2011/119441 A1 (BIONEX SOLUTIONS) discloses a transfer and testing device for materials, which is equipped with independently movable carrier devices and receiving devices. The carrier devices, which are movable in the X- and Z-direction and which have hollow needles, are arranged in a manner suspended on the underside of a stationary beam construction, which is supported at both ends of the device. The receiving devices are arranged such as to be movable in the Y-direction and rotatable in the X/Y plane and are equipped for example with microplates, into the wells of which sample materials can be transferred. Due to the combined translational and rotational movement of the carrier devices and receiving devices, the movement distances can be minimized.

The object of the invention is to considerably shorten the average duration of pipetting processes in a pipetting machine or a pipetting device, and thus to achieve the greatest possible throughput, particularly in the case of pipetting tasks in which the type and quantity of dispensed reagents and samples constantly changes between individual pipetting operations.

SUMMARY OF THE INVENTION

This object is achieved according to the invention in that the arm of the movable pipettor has at least one second pipetting needle which, regardless of the current position of the first pipetting needle, is movable independently past the first pipetting needle and is lowerable into the individual vessels.

The movement distance available to each pipetting needle on the arm of the pipettor can thus be used in its entirety, regardless of the position of the respective other pipettor.

The method according to the invention for transferring liquid samples and/or reagents from sample vessels and/or reagent vessels into at least one receiving vessel of an automatic pipetting device, using a pipettor which is movable horizontally along a first direction, is characterized by the following steps:
  moving a first pipetting needle of the pipettor along a horizontal second direction, substantially normal to the first direction, in order to transfer a predetermined quantity of a liquid sample or reagent from a sample vessel or reagent vessel into the receiving vessel;
  lowering the first pipetting needle into the sample vessel or reagent vessel;
  taking up a predetermined quantity of sample liquid or reagent liquid and moving the first pipetting needle to the position of the receiving vessel;
  dispensing the predetermined quantity of sample liquid or reagent liquid into the receiving vessel; and
  moving a second pipetting needle of the same pipettor in the second direction, regardless of the current position of the first pipetting needle, in order to simultaneously carry out additional pipetting tasks.

An increase in throughput is thus achieved as a result of the fact that the two pipetting needles can move past one another unhindered, wherein the first pipetting needle can pipette samples for example, while the second pipetting needle can pipette reagents at the same time as and independently of the first pipetting needle, or also a second type of sample or reagent can be pipetted. In addition, a sample can be split between the two pipetting needles and then can be pipetted simultaneously into two different, non-adjacent vessels which are freely selectable in the y-direction.

One embodiment variant of the invention provides that the pipettor of the pipetting device has different pipetting needles, wherein the pipetting needles each have hollow needles or cannulas which differ in the type of materials used, the internal volumes and/or the geometry of the hollow needles or cannulas.

For certain pipetting tasks, in which two different types of pipetting needles must be used, it may be advantageous that two different pipetting needles are used on one and the same pipettor. By way of example, one of the pipetting needles attached to the pipettor may have a particularly small internal volume of the hollow needle in the µl range in order to increase the precision, while the second hollow needle has a correspondingly larger internal volume in order to dispense larger volumes. In another embodiment according to the invention, one of the hollow needles may be made at least in part of a different material (for example of a corrosion-resistant alloy, plastic or steer, or may for example be coated with hydrophobic or hydrophilic substances on the inner and/or outer side of the hollow needle in order to control the wetting. The needles may also differ by other modifications which do not necessarily concern only the surfaces that come into contact with media, such as for example conductive needle components, sensors, heating devices or cooling devices, which are part of the hollow needle or are in contact with the hollow needle. However, the second needle may also differ in terms of its geometry; for example, it may have a different tip angle in order to facilitate the detachment of droplets, or it may have a different length, or a different diameter, in order to better adapt the needle to the pipetting tasks in question.

Thus, by using different pipetting needles which are independently movable in the y-direction on one and the same pipettor, a wide variety of pipetting tasks can be made possible without requiring an additional pipettor or a needle exchange station. Furthermore, contrary to when a second pipettor is used, a collision of two pipetting needles during operation is not possible, thereby simplifying the movement paths and making it easier to control the pipetting device.

Regardless of the type of pipetting task, a further increase in throughput is achieved when the pipettor of the pipetting device has at least one needle washing unit for the first and the second pipetting needles, which needle washing unit is movable with the pipettor. By way of example, a pipetting process can be carried out with one pipetting needle, while at the same time the second pipetting needle is being cleaned. The configuration of the pipettor is characterized in that the y-movement of the respective pipetting needle is possible without also moving the weight of the needle washing unit carried on the pipettor, as a result of which the two pipetting needles can be accelerated and slowed much faster in the y-direction.

It is particularly advantageous to carry a separate needle washing unit for each of the two pipetting needles.

According to another preferred embodiment of the pipettor, the first and the second pipetting needle are designed to be movable substantially parallel to one another at least in sub-regions of the arm of the pipettor. This configuration has the advantage of higher precision when stopping at a stop point (for example a liquid vessel) located in the horizontal, since the guide rails for the pipetting needles, which are attached to the side surface of the pipettor arm that is formed for example of sheet-metal or metal profiles, can be better aligned and supported. In addition, the guide rails act like strut elements and, by increasing the stiffness of the pipettor arm, have an advantageous effect on the ability of the pipettor to accelerate in the x-direction.

In one preferred embodiment variant of the invention, the two independently movable pipetting needles are arranged on opposite longitudinal sides or side faces of the arm of the pipettor. This embodiment enables an unhindered movement of the pipetting needles along the entire length of the arm and of the working area. In addition, the stiffness of the arm is increased, as a result of which the latter can be made thinner and lighter.

Further advantages of attaching the two pipetting needles to the sides are that the automatic pipetting device can be made more compact and the width thereof does not exceed the total length of the horizontal arm. In addition, the energy chains necessary for supplying power to the pipetting needles can be guided along the top side of the arm without any problem, wherein there is also more space available for the hose lines of the fluidics, particularly if the latter can form movement loops in the upward direction without hindrance during a lifting movement of the pipetting needles.

According to one embodiment variant of the invention, on at least one side of the arm of the pipettor, two jointly movable pipetting needles are connected via a lifting mechanism such that the two pipetting needles can be moved in opposite directions or in an antiparallel manner in the z-direction.

It is also advantageous if the horizontal arm of the pipettor is attached to a vertical tower which is movably attached to a rail extending in the x-direction. As a result, the rail extending in the x-direction can be attached, for example, to the transversely extending supports of a working area of the pipetting device, as a result of which, compared to a known suspended portal, the tolerances of the suspended pipettor can be kept small. In addition, by virtue of this configuration, short hose lines and power supply lines to the pipettor moving in the x-direction are possible, which has an advantageous effect on the pipetting accuracy and also on the total weight of the pipettor that has to be moved.

According to another advantageous embodiment of the pipetting device, the pipettor with its vertical tower and the horizontal arm has a substantially L-shaped basic structure, as a result of which on the one hand the working area is not interrupted by the width of the rail of the pipettor extending in the x-direction, and on the other hand some of the movement distances in the y-direction are considerably shortened.

The ability of the pipettor to accelerate in the x-direction can be considerably increased by another embodiment variant if the pipettor has with its vertical tower and the horizontal arm has a substantially T-shaped basic structure. This adds a further plane of symmetry to the basic structure of the pipettor, and makes it possible to further increase the stiffness of the pipettor. With a further reduced material thickness, the tower and the arm of the pipettor can have a reduced weight, and the pipettor can thus be better accelerated and slowed.

BRIEF DESCRIPTION OF THE DRAWINGS

The invention will be explained in greater detail below on the basis of exemplary embodiments, which are partially schematic and in which.

DETAILED DESCRIPTION

Parts which have the same function are provided with the same reference signs in the embodiment variants.

The automatic pipetting device shown in FIG. 1 has already been described in detail in the introductory part of the description (see U.S. Pat. No. 5,897,837 A).

Figure 2:
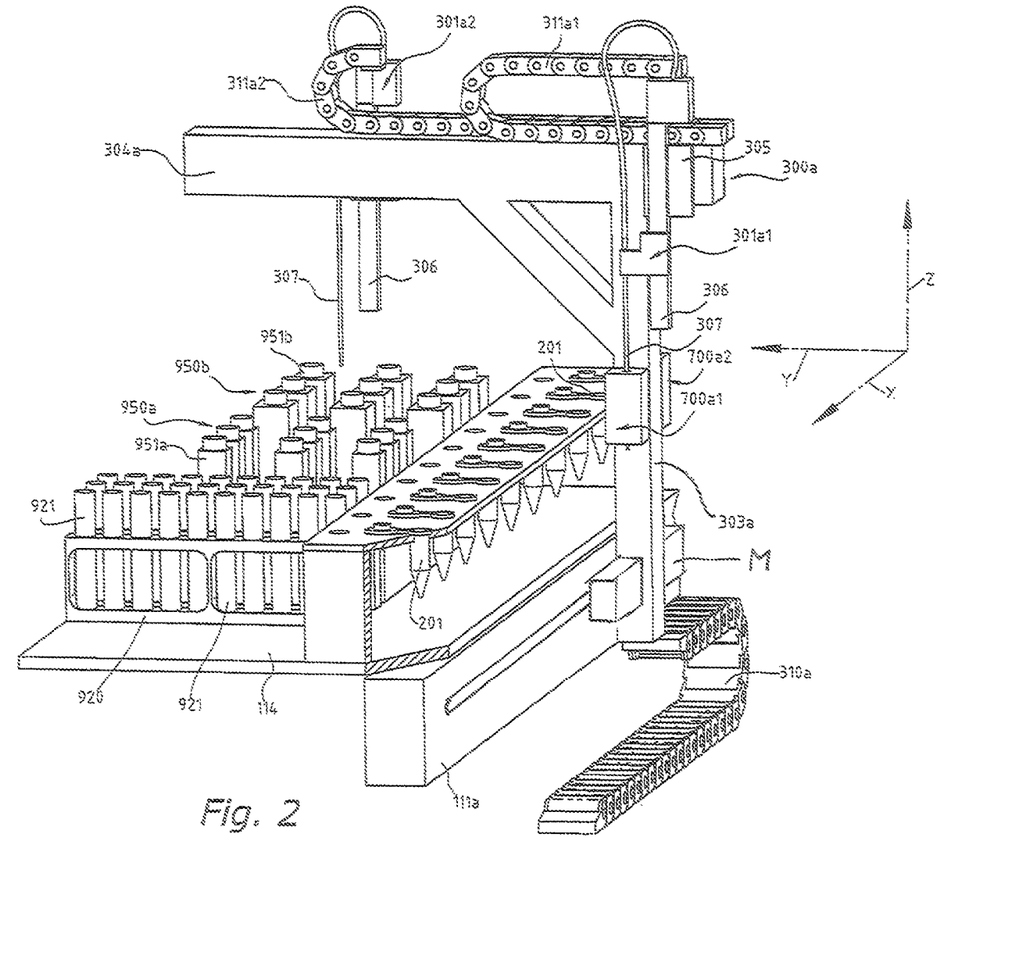
FIG. 2 shows an automatic pipetting device according to the invention for transferring samples and reagents, in a three-dimensional view.

The pipetting device according to the invention, which is shown in FIG. 2, serves for transferring samples from sample vessels 921, which are present in a sample store 920 on a table surface 114, and for transferring reagents from various reagent vessels 951a, 951b, which are present in reagent stores 950a, 950b, into at least one receiving vessel 201, for example a reaction vessel or a cuvette of an analyzer for analyzing liquid samples or a microtiter plate. Multiple receiving vessels 201 may be arranged in a row as a linear array, or also as a 2D array, for example in the form of a microtiter plate.

A movable pipettor 300*a* of the pipetting device is designed to be movable horizontally along a first direction (x-direction) and has a first pipetting needle 301*a*1 with a cannula or hollow needle 307, which is designed to be movable horizontally along an arm 304*a* of the pipettor 300*a* along a second direction (y-direction), substantially normal to the x-direction, and such as to be lowerable vertically in the z-direction into the individual vessels. According to the invention, the arm 304*a* of the movable pipettor 300*a* has a second pipetting needle 301*a*2 with a cannula or hollow needle 307 which, regardless of the current position of the first pipetting needle 301*a*1, can be moved in the y-direction and can be lowered into the individual vessels 921, 951*a*, 951*b* and 201. In this case, the second pipetting needle 301*a*2 can move past the first pipetting needle 301*a*1 unhindered, so that the entire movement distance along the arm 304*a* is available to both pipetting needles at all times.

In order to simplify the illustration in FIG. 2, only those components of the automatic pipetting device which are essential to the invention are shown, wherein other components of the pipetting device, such as pumps, valves, control units and drive units, which are preferably arranged below the table surface 114 oriented parallel to the x/y plane, will not be discussed in greater detail here.

In the illustrated example, the pipettor 300*a* of the pipetting device has two needle washing units 700*a*1, 700*a*2 which are movable with the pipettor 300*a* and which are respectively intended for the hollow needles 307 of the first pipetting needle 301*a*1 and of the second pipetting needle 301*a*2.

The first and the second pipetting needle 301*a*1, 301*a*2 are designed to be movable substantially parallel to one another at least in sub-regions, preferably in all regions, of the arm 304*a* of the pipettor 300*a*, wherein the two pipetting needles are preferably arranged on opposite longitudinal sides of the arm 304*a* of the pipettor 300*a*.

In the embodiment variant shown in FIG. 2, the pipettor 300*a* with its vertical tower 303*a* and the horizontal arm 304*a* has a substantially L-shaped basic structure, wherein the pipettor is movable at the side of the arrangement of the individual vessels 921, 951*a*, 951*b*, 201 of the sample store 920, of the two reagent stores 950*a*, 950*b* and of the arrangement of the receiving vessels 201.

For guiding fluidic lines and any electrical power supply lines and signal lines in the y-direction, the two pipetting needles 301*a*1, 301*a*2 have unrollable energy chains 311*a*1, 311*a*2. For guidance in the x-direction, an unrollable energy chain 310*a* is provided for said purposes.

Figure 3:
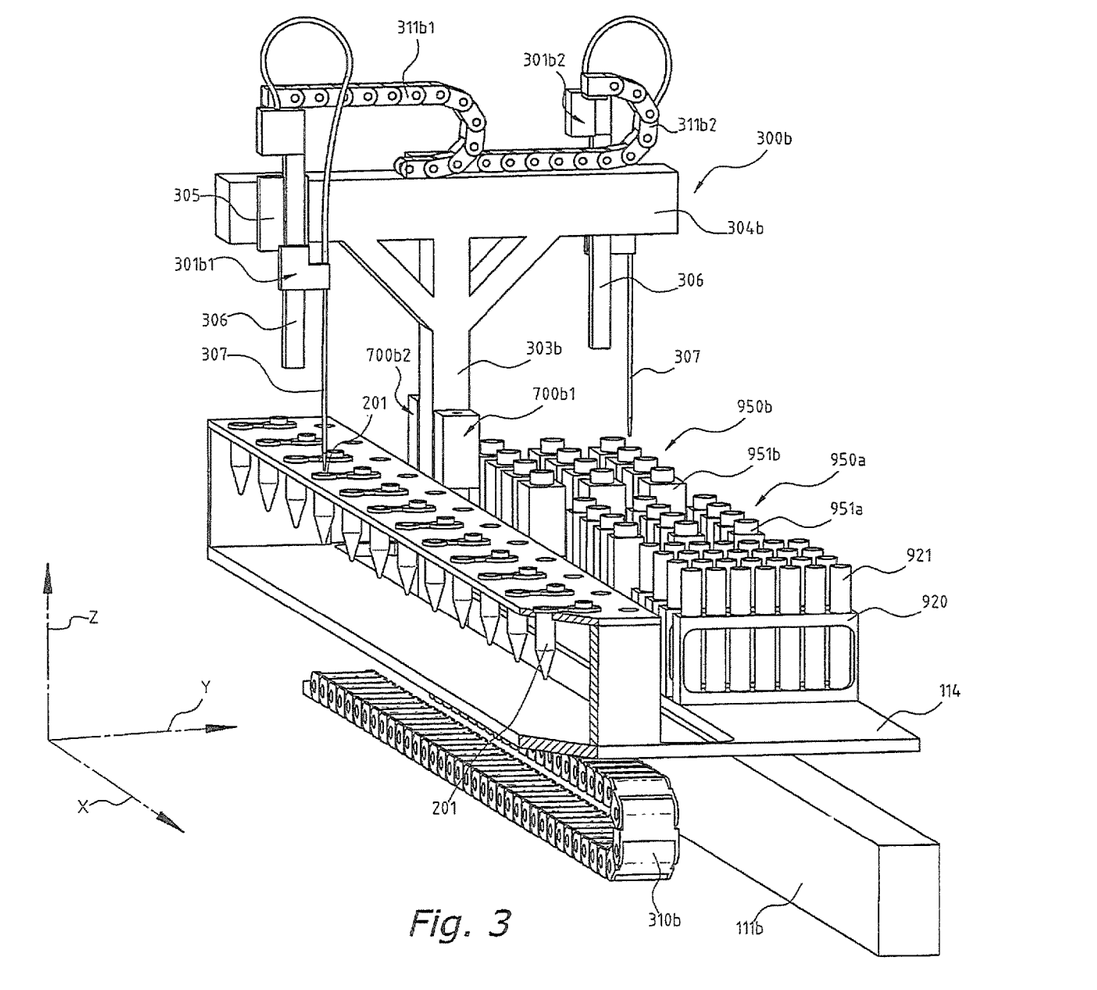
FIG. 3 shows a variant of the automatic pipetting device according to the invention as shown in FIG. 2.

FIG. 3 shows, as an embodiment variant of the pipetting device according to the invention, a movable pipettor 300*b* which with its vertical tower 303*b* and the horizontal arm 304*b* has a substantially T-shaped basic structure, so that in this case vessels 921, 951*a*, 951*b*, 201 can be arranged on both sides of the tower 303*b*. This pipettor 300*b*, too, has two pipetting needles 301*b*1, 301*b*2 which are movable independently of one another in the y-direction, and also needle washing units 700*b*1, 700*b*2 which are each movable with the pipettor 300*b*.

For both embodiment variants, the horizontal arm 304*a* or 304*b* of the pipettor 300*a* or 300*b* is attached to a vertical tower 303*a* or 303*b* which is fastened by means of a movable mount (M) to a rail 111*a* or 111*b* extending in the x-direction.

The two pipetting needles 301*a*1, 301*a*2 and 301*b*1, 301*b*2 are attached to the left and to the right of the arm 304*a* and 304*b* by means of mounts 305 which are movable in the y-direction, and thus can move past one another unhindered. Each mount 305 has a downwardly projecting rail portion 306, on which the needle can be lowered in the z-direction into the individual vessels 921, 951*a*, 951*b*, 201.

Here, the unrollable energy chains in the y-direction are labeled 311*b*1, 311*b*2 and that in the x-direction is labeled 310*b*.

The two pipettors 300*a* and 300*b* can also be used next to one another on rails 111*a*, 111*b* which are oriented parallel to one another.

Figure 7:
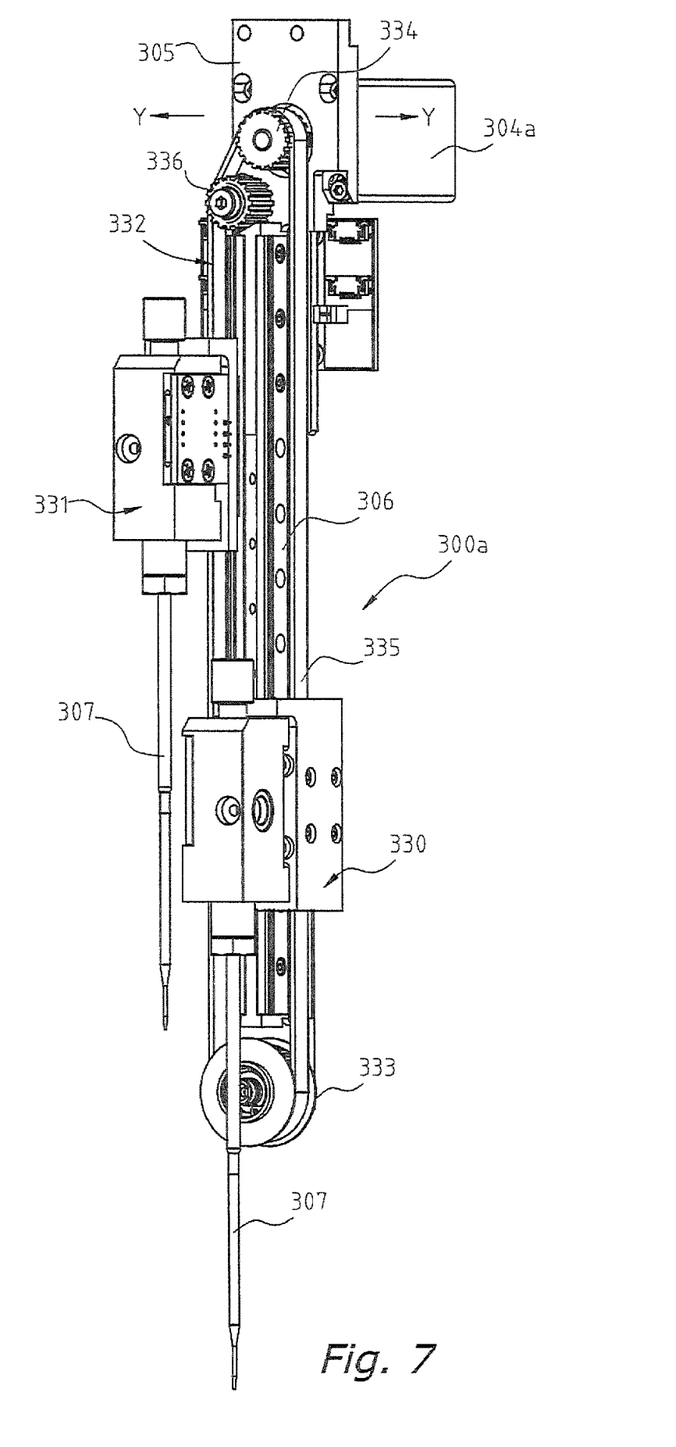
FIG. 7 shows a detail of an embodiment variant of the automatic pipetting device according to the invention as shown in FIG. 2.

According to an embodiment variant shown in FIG. 7, instead of a single pipetting needle, a double pipetting needle may be arranged on at least one side of the arm 304*a* of the pipettor 300*a* on the mount 305 which is movable in the y-direction, such that two jointly movable pipetting needles 330, 331 are connected via a lifting mechanism 332 which moves the two pipetting needles 330, 331 in opposite directions or in an antiparallel manner in the z-direction. The two hollow needles 307 may be made of different materials and may have different internal volumes and are thus available for different tasks which can be performed without large movement distances of the pipettor 300*a*.

The downwardly projecting rail portion 306 has rails arranged in parallel for the two pipetting needles 330, 331, wherein the lifting mechanism 332 may consist substantially of a toothed belt 335 which is guided around pulleys 333, 334 and acts on the two pipetting needles 330, 331 and is driven by a toothed belt wheel 336.

Figure 4:
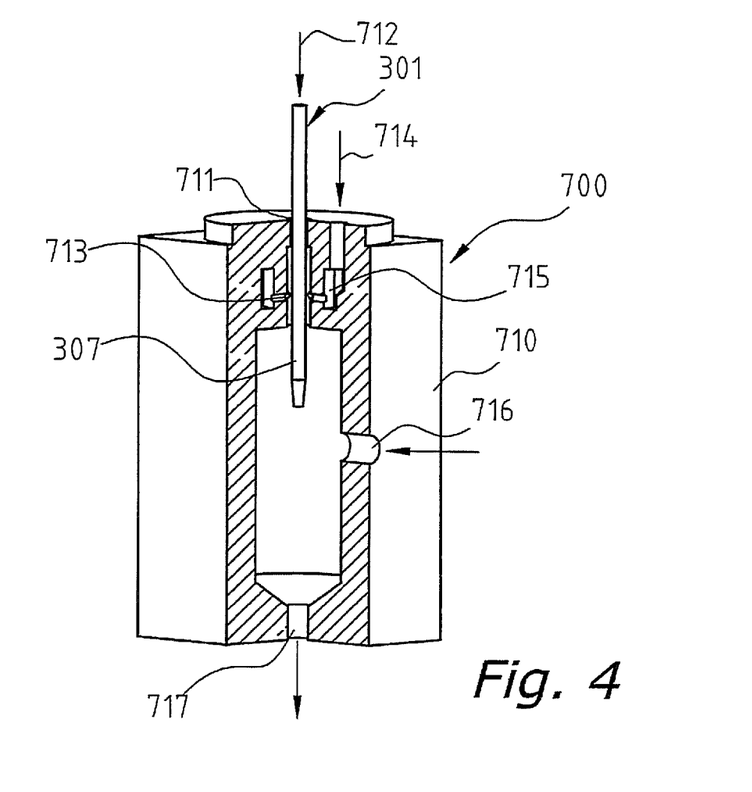
FIG. 4 shows a needle washing unit of the automatic pipetting device as shown in FIGS. 2 and 3, in an enlarged sectional illustration.

FIG. 4 shows, in an enlarged sectional illustration, the structure of a needle washing unit which is labeled with the general reference sign 700 and which corresponds to the substantially identically constructed needle washing units (700*a*1, 700*a*2, 700*b*1, 700*b*2) shown at different positions in FIGS. 2 and 3, and a pipetting needle which is labeled with the general reference sign 301 and which corresponds to the substantially identically constructed pipetting needles (301*a*1, 301*a*2, 301*b*1, 301*b*2) shown at different positions in FIGS. 2 and 3. The hollow needle 307 of the pipetting needle 301 is introduced through a receiving opening 711 in the housing 710 of the needle washing unit 700, wherein simultaneously the lumen of the needle is cleaned with a washing solution or the system liquid from the pressure transfer channel 712 and the outer side of the needle is cleaned with a rinsing liquid 714 which is supplied from an annular chamber 715 via lateral cleaning nozzles 713. In order to clean the inside and the outside of the hollow needle 307 by repeatedly aspirating and discharging washing solution from the lower part of the needle washing unit, washing solution may be supplied through a radial inlet 716 and can then be emptied through an extraction opening 717.

Figure 5:
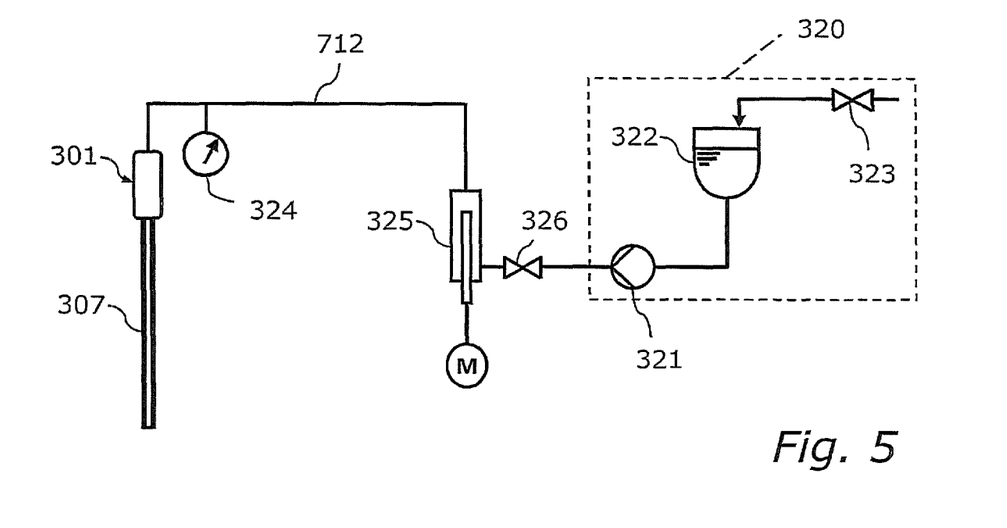
FIG. 5 shows fluidic elements of a pipetting needle of a pipettor as shown in FIG. 2 or 3, in a schematic illustration.

FIG. 5 shows the fluidic circuit diagram of a pipetting needle 301, the hollow needle 307 of which is connected, via a pressure transfer channel 712 which is filled with a degassed liquid, to a precision piston pump 325, preferably a positive displacement pump (diluter) which is driven by a stepper motor. The positive displacement pump has on the side an additional liquid connection which is connected via a solenoid valve 326 to a supply unit 320 for a system liquid, which conveys for example degassed, deionized water via a rinsing pump 321 from a storage vessel 322, which can be refined or pressurized via a solenoid valve 323.

In order to detect faults, the pressure transfer channel 712 has, in the vicinity of the pipetting needle 301, a further connection to a pressure sensor 324, which is connected to an evaluation and control unit (not shown here), for example in order to detect blockages of the hollow needle 307.

Description of a Pipetting Process

In order to transfer a defined quantity of liquid, for example using the pipetting needle 301a2 shown in FIG. 2, the latter is first moved in the horizontal direction to a first vessel, 5 µl of air (spacer) is aspirated into the tip of the hollow needle 307, and the pipetting needle 301a2 is lowered in the direction of the liquid surface of the first vessel. In order to ensure a sufficient, but not excessive, depth of immersion of the pipetting needle 301a2, the downward movement of the hollow needle 307 is stopped at a defined depth of immersion by a signal from a liquid surface detection device (not shown), for example using a capacitive detection principle. In order to aspirate a defined quantity of liquid with high accuracy in the µl range, a negative pressure is then generated in the hollow needle 307 of the pipetting needle 301a2 by moving the working piston of the positive displacement pump (diluter) shown in FIG. 5 in the downward direction, which causes a corresponding volume of liquid to be aspirated from a first vessel. The pipetting needle 301a2 is then moved together with the aspirated liquid, which is separated from the system liquid by a separating air bubble (spacer), to a second vessel, wherein the process then takes place in the opposite direction and the aspirated liquid is dispensed through the tip of the hollow needle 307 into the second vessel. At least between two pipetting processes involving different liquids to be pipetted, an internal and external cleaning of the pipetting needle 301a2 always takes place in the needle washing unit 700a2 of the latter. During the pipetting process using the pipetting needle 301a2, the pipetting needle 301a1 can be being cleaned and dried in the needle washing unit 700a1 thereof.

Figure 6:
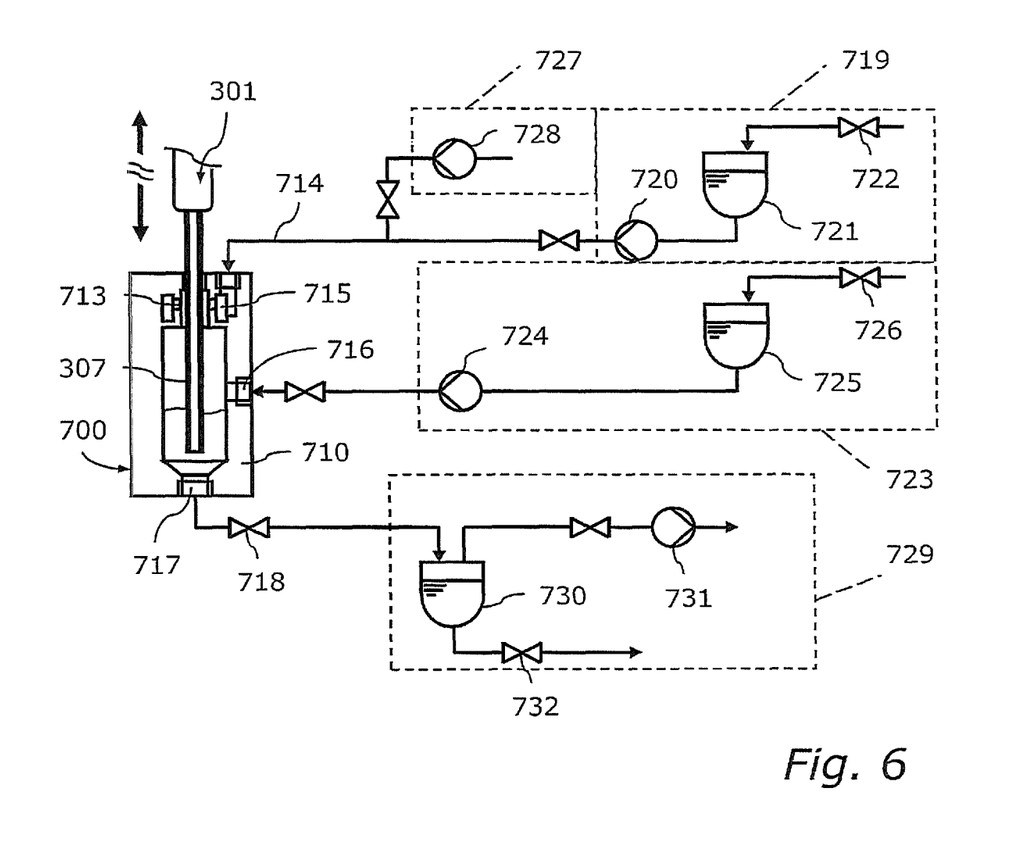
FIG. 6 shows fluidic elements of the needle washing unit as shown in FIG. 4, in a schematic illustration.

FIG. 6 shows the fluidic circuit diagram of a needle washing unit 700 according to FIG. 4, with the hollow needle 307 of the pipetting needle 301 lowered therein. The housing 710 of the needle washing unit has in the upper region a concentrically extending annular chamber 715, which acts as a media supply for a plurality of inner, concentrically oriented cleaning nozzles 713 and which is connected via respective solenoid valves to a supply unit 719 for a rinsing liquid (for example deionized water) and a supply unit 727 for dry air.

An inlet 716 arranged radially at mid-height of the housing 710 of the needle washing unit 700 is likewise connected to a solenoid valve and serves solely for supplying surfactant-containing washing solution from a supply unit 723.

The supply units 719 for a rinsing liquid and 723 for a washing solution each have a pump 720, 724 which conveys rinsing liquid or a surfactant-containing washing solution from the respective storage containers 721, 725, which can each be refilled or pressurized via a solenoid valve 722, 726. The supply unit 727 for air has an air pump 728 for supplying compressed air and optionally a drying means (not shown).

The extraction opening 717 located at the bottom of the needle washing unit 700 is connected via a solenoid valve 718 to the wastewater collection unit 729, which is under a vacuum and substantially consists of a collecting container 730 which has in the gas space above the liquid a connection to a vacuum pump 731, which is connected to the collecting container 730 via a solenoid valve. The wastewater collected can be discharged via a solenoid valve 732 at the bottom of the collecting container 730 and can be fed to a further wastewater treatment.

Description of a Needle Washing Process

In a typical process for washing the pipetting needle 301 (the same applies to all the pipetting needles 301a1, 301a2, 301b1, 301b2), said needle is first moved horizontally to the needle washing unit 700 and is lowered into the lower holding position of the washing chamber. All the wastewater that is produced when cleaning the pipetting needle 301 is sucked away via the extraction opening 717 located at the bottom, is collected, and is optionally subjected to an aftertreatment. Residual amounts of the last-pipetted liquid which are located in and on the needle tip are then emptied and sucked away via the precision piston pump 325 of the pipetting needle 301, which is shown in FIG. 5. Finally, the lowered pipetting needle 301 is rinsed from behind by means of the supply unit 320 for system liquid, which is shown in FIG. 5.

In a next step (with the solenoid valve 718 at the extraction opening 717 closed), a defined volume of surfactant-containing washing solution is introduced through the inlet 716 in the housing 710 of the needle washing unit 700, as a result of which the chamber in the lower part fills with a defined level of washing solution. The hollow needle 307 of the pipetting needle 301 is lowered so far until an external wetting of the needle can take place by immersion in the washing solution and an internal wetting of the hollow needle 307 can take place as a result of the washing solution being aspirated into the needle interior. The aspirated washing solution is then discharged again, it being possible for the process of aspirating and discharging the washing solution to be repeated multiple times in order to improve the cleaning effect.

In a last step, the contaminated washing solution is sucked away and the interior of the hollow needle 307 is rinsed with system water (for example degassed, deionized water), while the outer side of the hollow needle 307 is at the same time rinsed with rinsing liquid from the supply unit 719 by the concentrically arranged cleaning nozzles 713 located at the top, the tip of the hollow needle 307 being moved upward from the bottom in order to improve the cleaning effect.

Once the simultaneous rinsing of the inside and the outside is complete, the hollow needle 307 is moved back into the lower holding position, the media supply to the cleaning nozzles 713 is switched to the supply unit 727 for compressed air, and the tip of the hollow needle 307 again moves upward from the bottom, as a result of which adhering water droplets can quickly be removed from the needle surface. The pipetting needle 301 can then be moved out of the needle washing unit 700 and, after aspirating a separating air spacer (5 µl), is again ready for pipetting.

EXAMPLES

The automatic pipetting device shown in FIG. 2 operates for example as follows:

Prior to a pipetting task, the control unit (not shown) of the pipetting device brings together, from known and previously input information, all the data required for transferring the samples and reagents (transfer protocol, positions of the vessels 921, 951a, 951b containing the analysis samples and containing the reagents that are required (for example for a subsequent analysis), positions of free receiving vessels 201, etc.).

The pipettor 300a is first moved in the horizontal x-direction until it is level with a sample vessel or reagent vessel 921, 951a, 951b selected by the control unit.

Thereafter, the first pipetting needle 301a1 of the pipettor 300a moves along a horizontal y-direction, substantially normal to the x-direction, to the selected sample vessel or reagent vessel 921, 951a, 951b, in order to transfer a predetermined quantity of a liquid sample or reagent from a sample vessel or reagent vessel into the receiving vessel 201 of the pipetting device.

The first pipetting needle 301a1 is then lowered in the z-direction into the sample vessel or reagent vessel 921, 951a, 951b, wherein a quantity of sample liquid or reagent liquid predefined by the control device is aspirated into the hollow needle 307 of the pipetting needle 301a1.

The first pipetting needle 301a1 is then moved to the position of the receiving vessel 201, wherein the pipettor 300a moves in the x-direction and the pipetting needle simultaneously moves in the y-direction in a manner guided on the horizontal arm 304a of the pipettor.

Once the position of the receiving vessel 201 has been reached and the pipetting needle 301a1 has been lowered, the predetermined quantity of sample liquid or reagent liquid is dispensed into the receiving vessel 201.

During all the above-described actions of the first pipetting needle 301a1, the second pipetting needle 301a2 of the same pipettor 300a, regardless of the current position of the first pipetting needle 301a1, can be moved in the y-direction and can be used to carry out additional pipetting tasks simultaneously.

The second pipetting needle 301a2 can pipette samples or reagents independently of the first pipetting needle, or else can be washed in the needle washing unit 700a2.

The invention claimed is:

1. An automatic pipetting device for transferring samples and/or reagents from sample vessels and/or reagent vessels into receiving vessels, the pipetting device comprising:
   a rail extending in a first horizontal direction;
   a pipettor movable along the rail in the first horizontal direction and including
   a mount coupled to the rail and configured and arranged to move in the first horizontal direction,
   a vertical tower coupled to the mount,
   an arm coupled to the vertical tower and aligned in a second horizontal direction, where the second horizontal direction is substantially perpendicular to the first horizontal direction, and
   at least one first pipetting needle configured and arranged to move along the arm of the pipettor in the second horizontal direction, and be lowerable, in a third direction, into the sample vessels, the reagent vessels and the receiving vessels; and
   wherein the arm of the pipettor includes at least one second pipetting needle which, regardless of the current position of the first pipetting needle, is configured and arranged to be movable past the first pipetting needle and is lowerable into the sample vessels, the reagent vessels and the receiving vessels;
   wherein the at least one first and the at least one second pipetting needles are arranged on opposite longitudinal sides or side faces of the arm.

2. The pipetting device according to claim 1, wherein the at least one first pipetting needle and the at least one second pipetting needle are both hollow needles, and differ in the type of materials used, the internal volumes and/or the geometry of the hollow needles.

3. The pipetting device according to claim 1, wherein the pipettor further includes at least one needle washing unit for the at least one first and the at least one second pipetting needles, the needle washing unit configured and arranged to be movable with the pipettor.

4. The pipetting device according to claim 1, wherein the at least one first and the at least one second pipetting needles are configured and arranged to be movable substantially parallel to one another at least in partial regions of the arm.

5. The pipetting device according to claim 1, wherein, on at least one side of the arm, the at least one first and the at least one second pipetting needles are connected via a lifting mechanism and are configured and arranged to be movable in opposite directions along the z-direction.

6. The pipetting device of claim 5, wherein the at least one first and the at least one second pipetting needles are further configured and arranged to be moveable in an antiparallel manner, relative to one another.

7. The pipetting device according to claim 1, wherein the vertical tower and the arm are substantially L-shaped.

8. The pipetting device according to claim 1, wherein the vertical tower and the arm are substantially T-shaped.

9. A method for transferring liquid samples and/or reagents from sample vessels and/or reagent vessels into at least one receiving vessel of an automatic pipetting device according to claim 1, comprising the following steps:
   moving a first pipetting needle of the pipettor along a horizontal second direction, substantially normal to the first direction, in order to transfer a predetermined quantity of a liquid sample or reagent from a sample vessel or reagent vessel into the receiving vessel;
   lowering the first pipetting needle into the sample vessel or reagent vessel,
   up a predetermined quantity of sample liquid or reagent liquid and moving the first pipetting needle to the position of the receiving vessel;
   dispensing the predetermined quantity of sample liquid or reagent liquid into the receiving vessel; and
   moving a second pipetting needle of the same pipettor in the second direction, regardless of the current position of the first pipetting needle, in order to simultaneously carry out additional pipetting tasks.

10. The method of claim 9, wherein the second pipetting needle is movable past the first pipetting needle and is lowerable into another sample vessel or reagent vessel.

11. The method of claim 9, further including cleaning the first and/or second pipetting needles with a needle washing unit which is moveable with the pipettor.

12. The method of claim 9, wherein the first pipetting needle and the second pipetting needle are movable substantially parallel to one another.

13. The pipetting device of claim 1, wherein the at least one receiving vessel is a part of an analyzer for analyzing liquid samples.

* * * * *